(12) United States Patent
Iizuka et al.

(10) Patent No.: US 6,937,353 B2
(45) Date of Patent: Aug. 30, 2005

(54) INFORMATION PROCESSING APPARATUS, MODE CONTROL METHOD AND STORAGE MEDIUM

(75) Inventors: Junichi Iizuka, Kawasaki (JP); Tasuku Hayakawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 318 days.

(21) Appl. No.: 09/122,741

(22) Filed: Jul. 27, 1998

(65) Prior Publication Data

US 2001/0043353 A1 Nov. 22, 2001

(30) Foreign Application Priority Data

Feb. 6, 1998 (JP) .......................................... 10-025596

(51) Int. Cl.⁷ ............................ G06F 3/12; G06F 13/00
(52) U.S. Cl. .................... 358/1.13; 358/1.14; 358/1.15
(58) Field of Search .............................. 358/1.14, 1.15, 358/1.2, 1.13, 1.16, 1.17; 713/320, 340

(56) References Cited

U.S. PATENT DOCUMENTS

| 5,617,572 | A | * | 4/1997 | Pearce et al. ............... 395/750 |
| 5,708,821 | A | * | 1/1998 | Takikita ...................... 395/750 |
| 5,803,623 | A | * | 9/1998 | Iwasaki ........................ 400/54 |
| 5,964,878 | A | * | 10/1999 | Ryu ............................ 713/323 |
| 6,111,657 | A | * | 8/2000 | Muto et al. .................. 358/1.2 |

FOREIGN PATENT DOCUMENTS

| JP | 1-175012 | 7/1989 | |
| JP | 02067615 A | 3/1990 | |
| JP | 5-204481 | 8/1993 | |
| JP | 8-192556 | 7/1996 | |
| JP | 8-234875 | 9/1996 | |
| JP | 09044324 | 2/1997 | |
| JP | 09044324 A | * 2/1997 | ............. G06F/3/12 |
| JP | 9-128105 | 5/1997 | |

OTHER PUBLICATIONS

Copy of Japanese Office Action mailed May 14, 2003 in Japanese Patent Application No. 10-025596.
European Search Report dated Feb. 20, 2002.

* cited by examiner

Primary Examiner—Douglas Tran
(74) Attorney, Agent, or Firm—Westerman, Hattori, Daniels & Adrian, LLP

(57) ABSTRACT

An information processing apparatus having a power save mode is constructed to include a spool storing print data, and a controller for monitoring a state of the spool and for prohibiting a transition to the power save mode in a state where the print data is stored in the spool.

26 Claims, 6 Drawing Sheets

INFORMATION PROCESSING APPARATUS, MODE CONTROL METHOD AND STORAGE MEDIUM

BACKGROUND OF THE INVENTION

The present invention generally relates to information processing apparatuses, mode control methods and storage mediums, and more particularly to an information processing apparatus which processes print data to be printed on a printer, a mode control method which controls a mode of such an information processing apparatus, and a computer readable storage medium which stores a program for controlling such an information processing apparatus.

In information processing apparatuses such as personal computers, a power save mode is provided to reduce the power consumption. Even in a state where the power is ON, if the information processing apparatus is not used, the power save mode puts various parts of the information processing apparatus to a state which is as close as possible to a power OFF state, so as to reduce the power consumption. In the power save mode, data exchanges among the various parts of the information processing apparatus are also put into a sleep state. In order to reduce the power consumption, the power save mode is an essential function of particularly portable information processing apparatuses.

The information processing apparatus is provided with a buffer memory or a spool which temporarily stores print data when connecting the information processing apparatus to a printer and transferring the print data to the printer. In addition, In addition, when no access is made from the user for over a predetermined time, the information processing apparatus automatically makes a transition to the power save mode, so as to forcibly discontinue the operation of the various parts of the information processing apparatus. For this reason, even in a case where the print data which is not yet transferred to the printer remains within the spool of the information processing apparatus, the transition to the power save mode is made based only on whether or not an access from the user exists. As a result, the print data remaining within the spool of the information processing apparatus is cleared when the information processing apparatus is forced to make the transition to the power save mode. Consequently, if the user makes an access to the information processing apparatus after the print data within the spool is cleared, the user must again carry out a print operation so as to store the print data again in the spool and to transfer the print data again to the printer.

On the other hand, the problems described above also occur when the information processing apparatus makes a transition to a power OFF state. In other words, the print data stored in the spool of the information processing apparatus is cleared when the information processing apparatus makes the transition to the power OFF state. For this reason, if the information processing apparatus thereafter makes a transition to a power ON state in response to an operation made by the user or the like, the user must again carry out a print operation so as to store the print data again in the spool and to transfer the print data again to the printer.

The above described problems generated in the power save mode can be prevented to a certain extent by a document creating apparatus proposed in a Japanese Laid-Open Patent Application No.1-175012, for example. According to this proposed apparatus, a register is provided to indicate whether or not an automatic paper feed of a printer is being made, and the transition to the power save mode is prohibited when the register indicates that the automatic paper feed is in progress.

In addition, the above described problems generated in the power OFF state can be prevented to a certain extent by a printer BIOS resume method proposed in a Japanese Laid-Open Patent Application No. 5-204481, for example. According to this proposed method, a judgement is made to determine whether or not a printer is operating, and the transition to the power OFF state is prohibited when it is judged that the printer is operating.

However, the proposed apparatus and the proposed method described above basically prohibit the transition to the power save mode or the power OFF state during the operation of the printer. Thus, even if all the data within the spool have been transferred to the printer and the information processing apparatus may make the transition to the power save mode or the power OFF state, there was a problem in that the transition to the power save mode or the power OFF state is prohibited while the printer is operating. For this reason, in cases where a large amount of data is to be printed on the printer, a print speed of the printer is slow and the like, the printer continues to operate for a long time, thereby putting the information processing apparatus in a wait state for a long time.

SUMMARY OF THE INVENTION

Accordingly, it is a general object of the present invention to provide a novel and useful information processing apparatus, mode control method and storage medium, in which the problems described above are eliminated.

Another and more specific object of the present invention to provide an information processing apparatus, a mode control method and a storage medium which can quickly make a transition to a power save mode or a power OFF state regardless of an operating state of a printer when the transition of the information processing apparatus to the power save mode or the power OFF state becomes possible.

Still another object of the present invention is to provide an information processing apparatus having a power save mode, comprising a spool storing print data, and control means for monitoring a state of the spool and for prohibiting a transition to the power save mode in a state where the print data is stored in the spool. According to the information processing apparatus of the present invention, it is possible to quickly make a transition to the power save mode regardless of an operating state of a printer which is coupled to the information processing apparatus, when it becomes possible for the information processing apparatus to make the transition to the power save mode.

A further object of the present invention is to provide an information processing apparatus comprising a spool storing print data, and control means for monitoring a state of the spool and for prohibiting a transition to a power OFF state in a state where the print data is stored in the spool. According to the information processing apparatus of the present invention, it is possible to quickly make a transition to the power OFF state regardless of an operating state of a printer which is coupled to the information processing apparatus, when it becomes possible for the information processing apparatus to make the transition to the power OFF state.

Another object of the present invention is to provide a mode control method for controlling a mode of an information processing apparatus, comprising a control step monitoring a state of a spool which stores print data and prohibiting a transition to a power save mode in a state where the print data is stored in the spool. According to the mode control method of the present invention, it is possible to quickly make a transition to the power save mode regardless of an operating state of a printer which is coupled to the information processing apparatus, when it becomes possible for the information processing apparatus to make the transition to the power save mode.

Still another object of the present invention is to provide a mode control method comprising a control step monitoring a state of a spool which stores print data and prohibiting a transition to a power OFF state in a state where the print data is stored in the spool. According to the mode control method of the present invention, it is possible to quickly make a transition to the power OFF state regardless of an operating state of a printer which is coupled to the information processing apparatus, when it becomes possible for the information processing apparatus to make the transition to the power OFF state.

A further object of the present invention is to provide a computer readable storage medium which stores a program for controlling an information processing apparatus, comprising means for causing the information processing apparatus to store print data in a spool, and control means for causing the information processing apparatus to monitor a state of the spool and prohibit a transition to the power save mode in a state where the print data is stored in the spool. According to the storage medium of the present invention, it is possible to quickly make a transition to the power save mode regardless of an operating state of a printer which is coupled to the information processing apparatus, when it becomes possible for the information processing apparatus to make the transition to the power save mode.

Another object of the present invention is to provide a computer readable storage medium which stores a program for controlling an information processing apparatus, comprising means for causing the information processing apparatus to store print data in a spool, and control means for causing the information processing apparatus to monitor a state of the spool and prohibit a transition to a power OFF state in a state where the print data is stored in the spool. According to the storage medium of the present invention, it is possible to quickly make a transition to the power OFF state regardless of an operating state of a printer which is coupled to the information processing apparatus, when it becomes possible for the information processing apparatus to make the transition to the power OFF state.

Other objects and further features of the present invention will be apparent from the following detailed description when read in conjunction with the accompanying drawings.

DETAILED DESCRIPTION OF THE PREFERRED EMBODIMENTS

Figure 1:
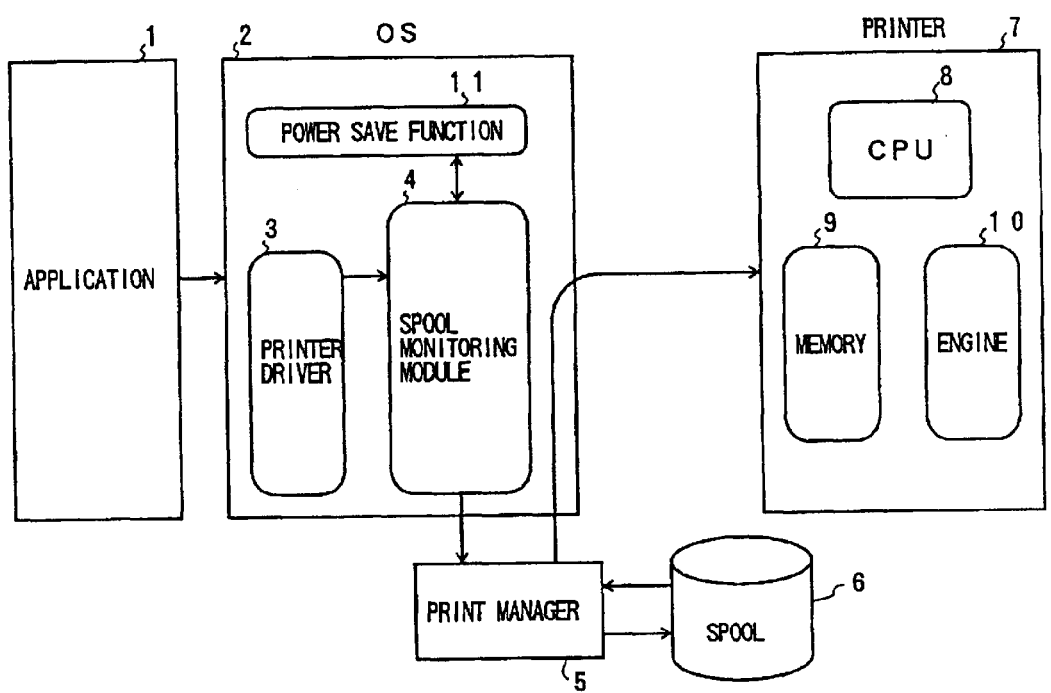
FIG. 1 is a system block diagram generally showing the software construction of a first embodiment of the information processing apparatus according to the present invention.

FIG. 1 is a system block diagram generally showing the software construction of a first embodiment of an information processing apparatus according to the present invention. In this embodiment, the present invention is applied to a personal computer, and in this case, the personal computer may be a desk-top type or a portable type such as a lap-top computer. This first embodiment of the information processing apparatus employs a first embodiment of a mode control method according to the present invention and a first embodiment of a storage medium according to the present invention.

The storage medium according to the present invention includes semiconductor memory devices such as ROMs and RAMs, and various kinds of recording mediums such as magnetic disks, optical disks, magneto-optic disks and card shaped recording mediums. The storage medium stores a computer readable program.

FIG. 1 shows the software construction of the personal computer. The personal computer generally includes an application software (hereinafter simply referred to as an application) 1, an operating system (OS) 2, a print manager 5 which forms a managing means, and a spool 6. The print manager 5 manages and controls print data and the like stored in the spool 6. The spool 6 stores the print data to be printed on a printer 7 which is coupled to the personal computer, sequence data related to printing sequences of the print data, and the like. The OS 2 includes a printer driver 3, a spool monitoring module 4, and a power save function 11. The printer driver 3 converts the print data from the application 1 into a print command or the like which can be understood by the printer 7. In an enabled state, the spool monitoring module 4 monitors the state of the spool 6 via the print manager 5, notifies information indicating the state of the spool 6 to the power save function 11, and controls the power save function 11. The power save function 11 changes the operating mode of the personal computer to the power save mode if no access is made to the personal computer for over a predetermined time. The power save function 11 puts various parts of the personal computer into a state which is as close as possible to a power OFF state, and reduces the power consumption compared to the normal operating mode. This power save function 11 is known.

On the other hand, the printer 7 which is coupled to the personal computer generally includes a central processing unit (CPU) 8, a buffer memory 9, and an engine 10 which includes an image forming part.

First, the print data output from the application 1 is converted into the print command or the like by the printer driver 3, and is input to the print manager 5 via the spool monitoring module 4. The print manager 5 stores the print data in the spool 6. The power save function 11 monitors the access to the personal computer from the user, and when no access is made for over a predetermined time, controls the various parts of the personal computer, including the printer driver 3, to a state which is as close as possible to the power OFF state, to set the personal computer to the power save mode.

The CPU 8 of the printer 7 monitors the state of the buffer memory 9 when the print command is input from the personal computer, and makes a print data transmission request to the printer manager 5 when a sufficient storage capacity of the buffer memory 9 is usable. The CPU 8 controls the storage of the print data which is transmitted from the personal computer and is stored in the buffer memory 9, the transmission and reception of the data between the buffer memory 9 and the engine 10, the print operation of the engine 10, and the like.

This embodiment is characterized in that the spool monitoring module 4 is provided within the OS 2. First, the spool monitoring module 4 in the enabled state instructs the print manager 5 to notify the information related to the spool 6. The print manager 5 constantly controls the existence and amount of print data within the spool 6 and/or the management information of the spool 6, and notifies such information to the spool monitoring module 4. The spool monitoring module 4 inputs the information notified from the print manager 5 to the power save function 11, so as to make the power save function 11 recognize the state of the present print process.

In this embodiment, when the spool monitoring module 4 is in the enabled state, the power save function 11 does not unconditionally set the personal computer to the power save mode, even if the user makes no access to the personal computer for over a predetermined time. In other words, when the spool monitoring module 4 in the enabled state, the power save function 11 prohibits the transition to the power save mode until all print data within the spool 6 are transferred to the buffer memory 9 of the printer 7 in a case where the print data remains within the spool 6, based on the information notified from the print manager 5 via the spool monitoring module 4.

The program which realizes the above described functions of the spool monitoring module 4 within the OS 2 is stored in the first embodiment of the storage medium.

Figure 2:
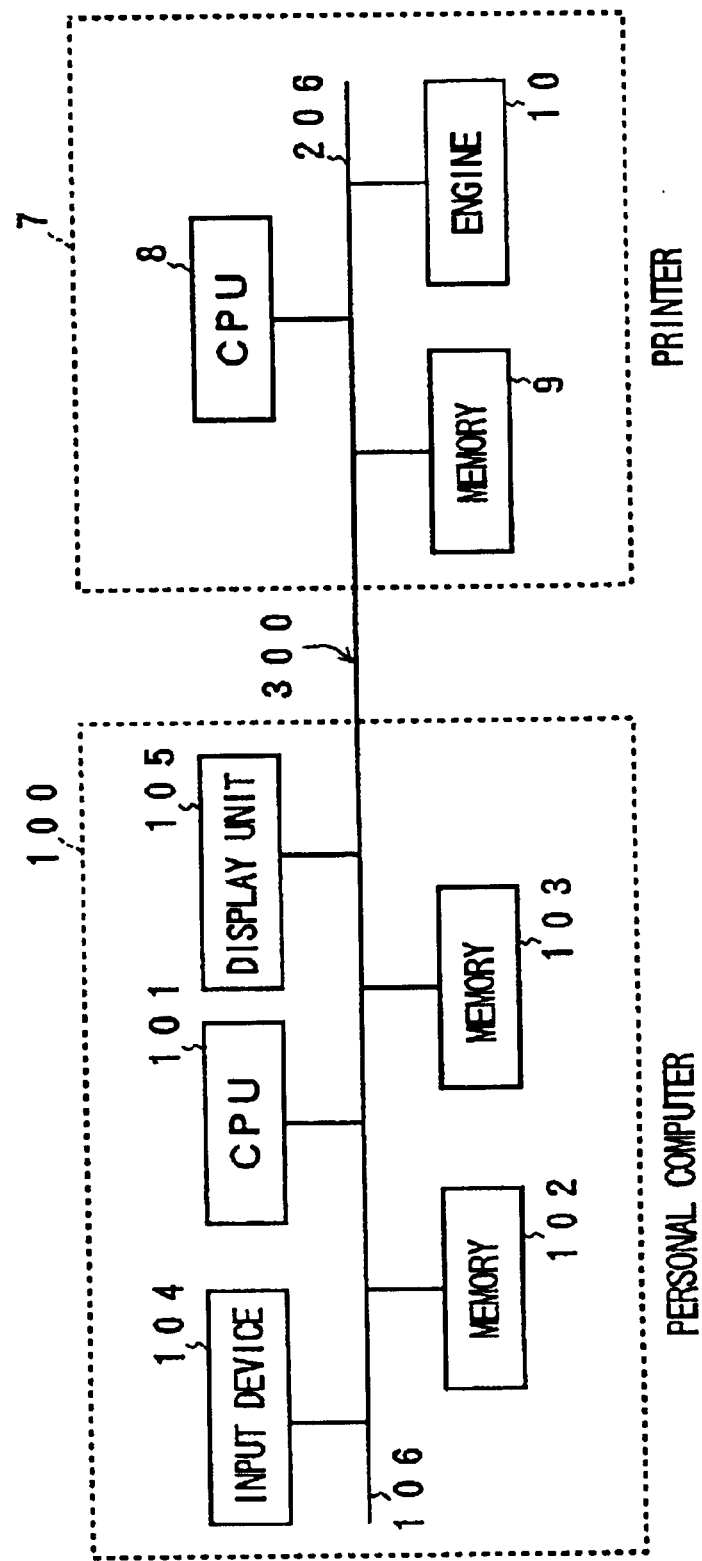
FIG. 2 is a system block diagram generally showing the hardware construction of the first embodiment.

FIG. 2 is a system block diagram generally showing the hardware construction of this embodiment. In FIG. 2, those parts which are the same as those corresponding parts in FIG. 1 are designated by the same reference numerals, and a description thereof will be omitted. A personal computer 100 includes a CPU 101, memories 102 and 103, an input device 104 made up of a keyboard, for example, a display unit 105, and a bus 106 which couples these elements of the personal computer 100. For example, the memory 102 stores the application 1 executed by the CPU 101, the OS 2 and the print manager 5. On the other hand, the memory 103 includes a region for storing the contents of the spool 6, a region for storing intermediate data of computation processes carried out by the CPU 101, and the like. These memories 102 and 103 are not limited to a specific storage unit or memory element as long as information can be stored therein, and at least one of these memories 102 and 103 forms the first embodiment of the storage medium according to the present invention.

The CPU 8, the buffer memory 9 and the engine 10 of the printer 7 are coupled by a bus 206. The bus 106 of the personal computer 100 and the us 206 of the printer 7 are coupled via an interface 300.

Figure 3:
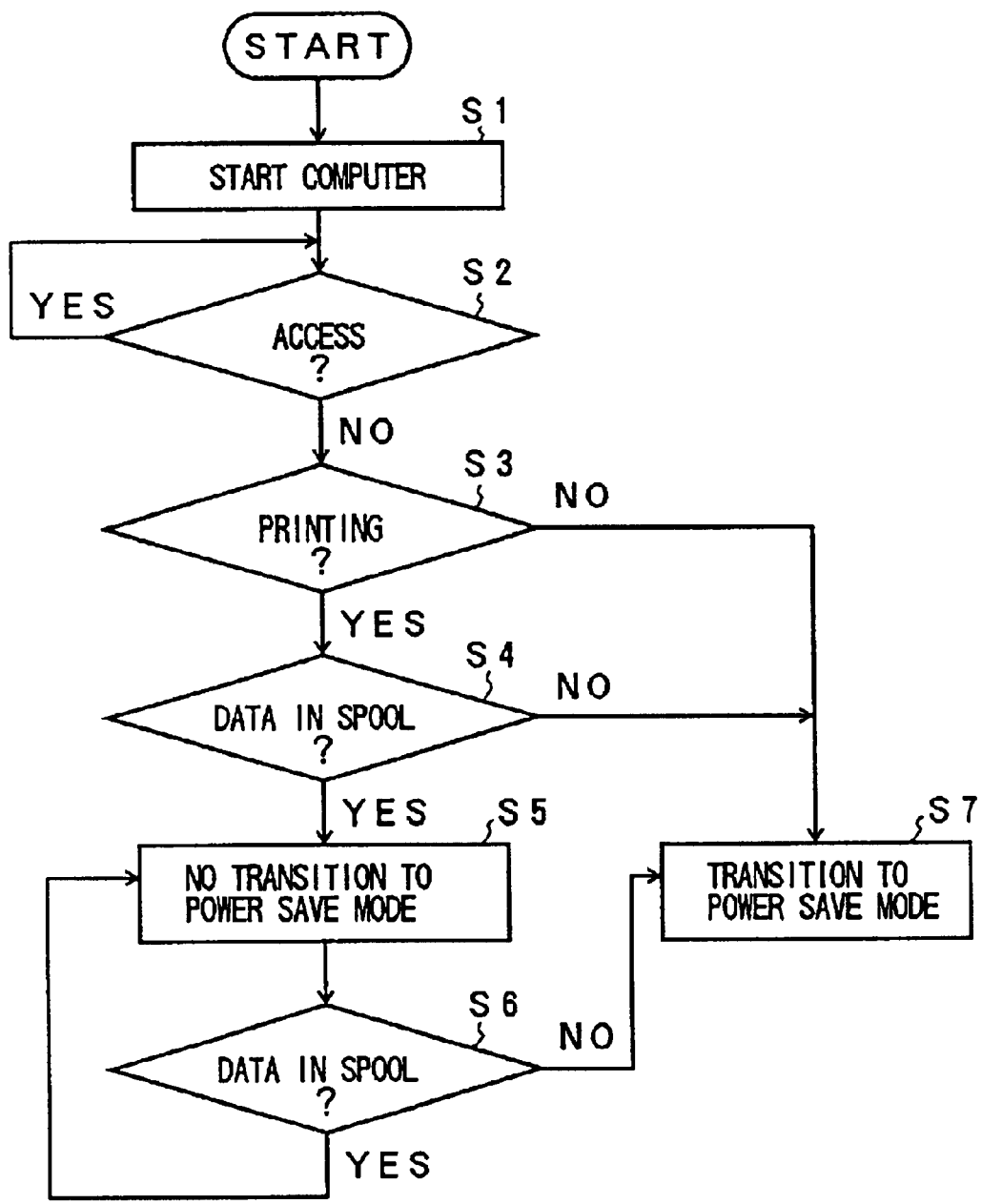
FIG. 3 is a flow chart for explaining the process carried out by a CPU of a personal computer in the first embodiment.

FIG. 3 is a flow chart for explaining the process carried out by the CPU 101 of the personal computer 100 in this embodiment. In FIG. 3, when the power of the personal computer 100 is turned ON to assume the power ON state, a step S1 starts the personal computer 100, and a step S2 decides whether or not a user access is made from the input device 104 within a predetermined time. If the decision result in the step S2 is YES, the personal computer 100 is maintained in the started state. On the other hand, if the decision result in the step S2 becomes NO, a step S3 decides whether or not the printer 7 is carrying out a print operation. If the decision result in the step S3 is YES, a step S4 decides whether or not the print data is stored in the spool 6 within the memory 102. If the decision result in the step S4 is YES, a step S5 prohibits the transition of the personal computer 100 to the power save mode by the power save function 11. In addition, a step S6 decides whether or not the print data is stored in the spool 6, and the process returns to the step S5 if the decision result in the step S6 is YES. Further, if the decision result in the step S3, S4 or S6 is NO, a step S7 permits the transition of the personal computer 100 to the power save mode by the power save function 11, and the personal computer 100 thereby makes a transition to the power save mode.

Accordingly, the process shown in FIG. 3 corresponds to the first embodiment of the mode control method. In addition, the memory 102 and/or the memory 103 which forms the first embodiment of the storage medium stores the program (means) for making the personal computer 100 (CPU 101) carry out the process shown in FIG. 3.

Next, a description will be given of a second embodiment of the information processing apparatus according to the present invention. The basic construction of this embodiment is the same as the basic construction of the first embodiment shown in FIGS. 1 and 2. This second embodiment of the information processing apparatus employs a second embodiment of the mode control method according to the present invention and a second embodiment of the storage medium according to the present invention.

In this embodiment, when the user inputs an instruction to put the spool monitoring module 4 into a disabled state, the spool monitoring module 4 is set to the disabled state, and the power save function 11 unconditionally sets the personal computer to the power save mode if the user makes no access to the personal computer for over a predetermined time.

Accordingly, in a case where the user makes no access to the personal computer for over the predetermined time, it is possible to select a mode for unconditionally setting the personal computer to the power save mode or, a mode for prohibiting the transition of the personal computer to the power save mode until all print data within the spool 6 are transferred to the buffer memory 9 of the printer 7.

Figure 4:
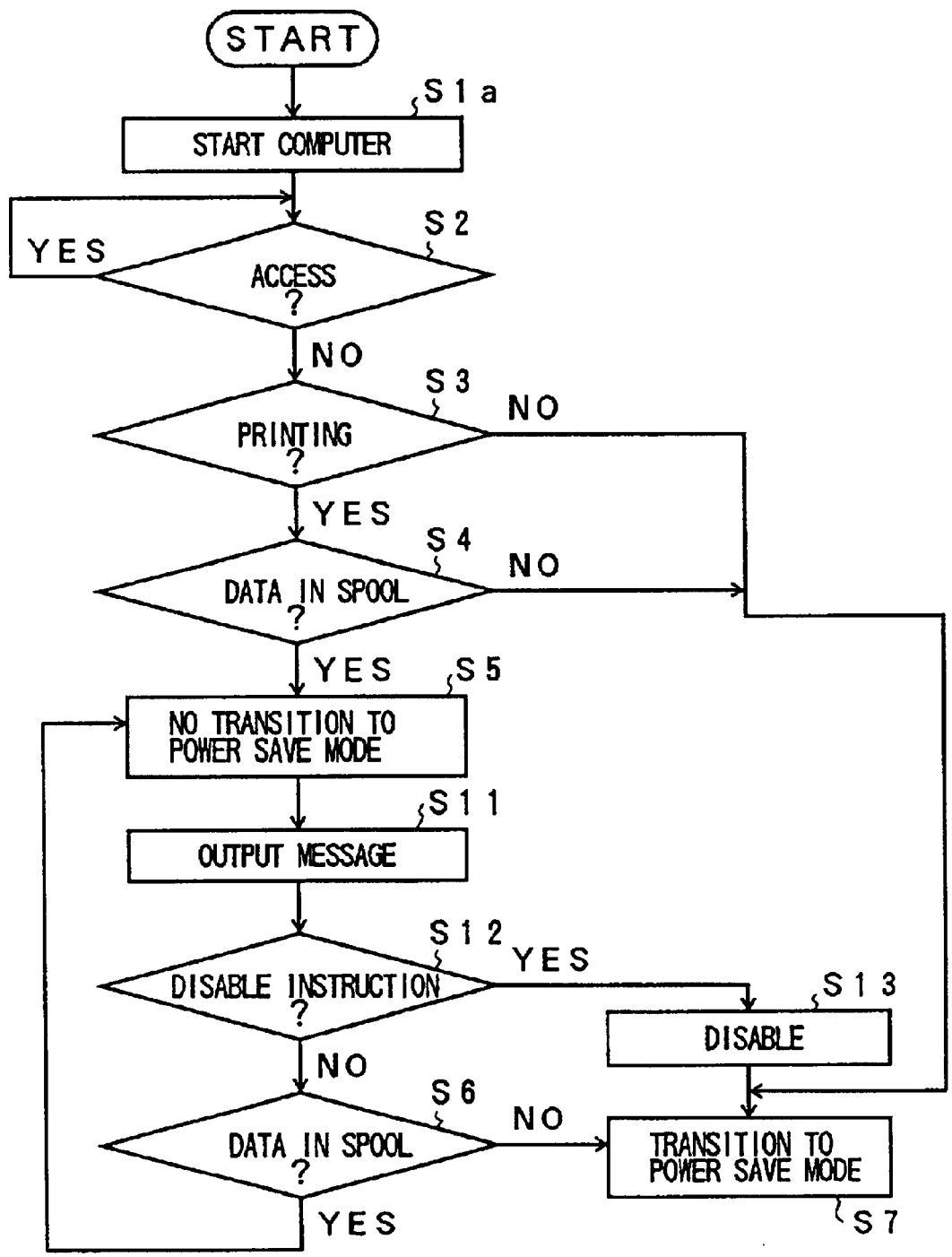
FIG. 4 is a flow chart for explaining the process carried out by a CPU of a personal computer in a second embodiment.

FIG. 4 is a flow chart for explaining the process carried out by the CPU 101 of the personal computer 100 shown in FIG. 2 in this second embodiment. In FIG. 4, those steps which are the same as those corresponding steps in FIG. 3 are designated by the same reference numerals, and a description thereof will be omitted. In this embodiment, the spool monitoring module 4 is normally set to the enabled state.

In FIG. 4, a step S1a sets the personal computer 100 to the started state, and also sets the spool monitoring module 4 to the enabled state. A step S11 displays a message on the display unit 105 to indicate that the printer 7 carrying out a print operation, so as to urge the user to make an input instructing the enabled/disabled state of the spool monitoring module 4. In addition, a step S12 decides whether or not the disabled state of the spool monitoring module 4 is instructed by the user from the input device 104, and the process advances to the step S6 if the decision result in the step S12 is NO. On the other hand, if the decision result in the step S12 is YES, a step S13 switches the spool monitoring module 4 from the enabled state to the disabled state, and the process advances to the step S7. As a result, when the spool monitoring module 4 is set to the disabled state, it is possible to unconditionally set the personal computer 100 to the power save mode if the user makes no access to the personal computer 100 for over a predetermined time.

Accordingly, the process shown in FIG. 4 corresponds to the second embodiment of the mode control method. In addition, the memory 102 and/or the memory 103 which forms the second embodiment of the storage medium stores the program (means) for making the personal computer 100 (CPU 101) carry out the process shown in FIG. 4.

The print data stored in the spool of the information processing apparatus is cleared when the information processing apparatus makes a transition to the power OFF state. For this reason, when the information processing apparatus thereafter makes a transition to the power ON state, it is necessary to store the print data again in the spool and to transfer the print data again to the printer. Next, a description will be given of an embodiment which can eliminate such inconveniences.

A description will be given of a third embodiment of the information processing apparatus according to the present invention. The basic construction of this embodiment is the same as the basic construction of the first embodiment shown in FIGS. 1 and 2. This third embodiment of the information processing apparatus employs a third embodiment of the mode control method according to the present invention and a third embodiment of the storage medium according to the present invention.

In this embodiment, when the spool monitoring module 4 is in the enabled state, the power save function 11 does not unconditionally set the personal computer to the power OFF state even if the user sets the personal computer to the power OFF state. In other words, when the spool monitoring module 4 is in the enabled state, the power save mode 11 prohibits the transition to the power OFF state until all print data within the spool 6 are transferred to the buffer memory 9 of the printer 7 in a case where the print data remains within the spool 6, based on information notified from the print manager 5 via the spool monitoring module 4.

Figure 5:
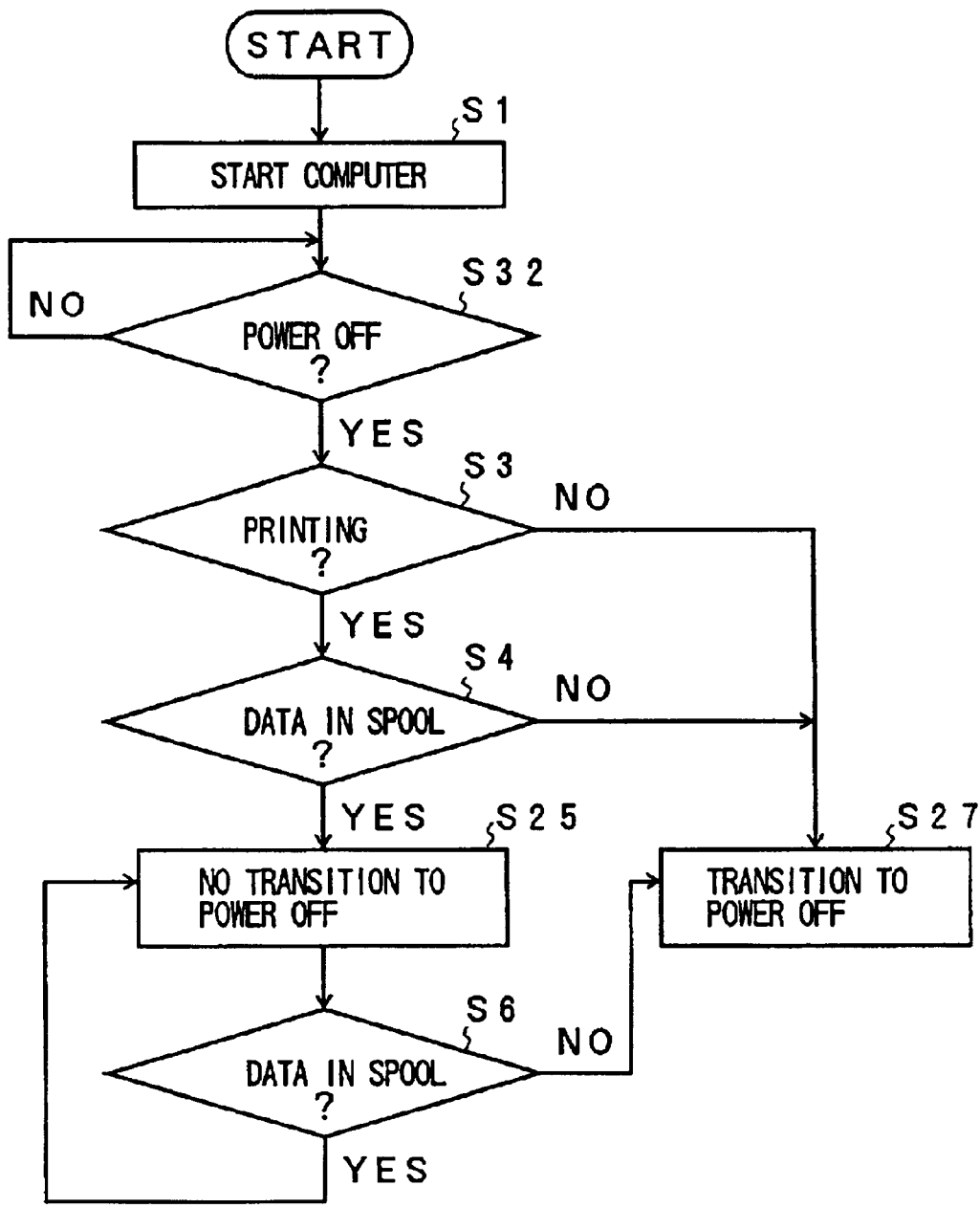
FIG. 5 is a flow chart for explaining the process carried out by a CPU of a personal computer in a third embodiment.

FIG. 5 is a flow chart for explaining the process carried out by the CPU 101 of the personal computer 100 in this third embodiment. In FIG. 5, when the personal computer 100 assumes the power ON state, the step S1 starts the personal computer 100, and a step S32 decides whether or not the personal computer 100 is set to the power OFF state by the user. If the decision result in the step S32 is NO, the personal computer 100 is maintained to the started state. On the other hand, if the decision result in the step S32 becomes YES, the step S3 decides whether or not the printer 7 is carrying out a print operation. If the decision result in the step S3 is YES, the step S4 decides whether or not the print data is stored in the spool 6 within the memory 102. If the decision result in the step S4 is YES, a step S25 prohibits the transition of the personal computer 100 to the power OFF state by the power save function 11. In addition, the step S6 decides whether or not the print data is stored in the spool 6, and the process returns to the step S25 if the decision result in the step S6 is YES. Further, if the decision result in the step S3, S4 or S6 is NO, a step S27 permits the transition of the personal computer 100 to the power OFF state by the power save function 11, and the personal computer 100 thereby makes a transition to the power OFF state.

Accordingly, the process shown in FIG. 5 corresponds to the third embodiment of the mode control method. In addition, the memory 102 and/or the memory 103 which forms the third embodiment of the storage medium stores the program (means) for making the personal computer 100 (CPU 101) carry out the process shown in FIG. 5.

Next, a description will be given of a fourth embodiment of the information processing apparatus according to the present invention. The basic construction of this embodiment is the same as the basic construction of the first embodiment shown in FIGS. 1 and 2. This fourth embodiment of the information processing apparatus employs a fourth embodiment of the mode control method according to the present invention and a fourth embodiment of the storage medium according to the present invention.

In this embodiment, when the user inputs an instruction to put the spool monitoring module 4 into a disabled state, the spool monitoring module 4 is set to the disabled state, and the power save function 11 unconditionally sets the personal computer to the power OFF state if the user sets the personal computer to the power OFF state.

Accordingly, in a case where the user sets the personal computer to the power OFF state, it is possible to select a mode for unconditionally setting the personal computer to the power OFF state or, a mode for prohibiting the transition of the personal computer to the power OFF state until all print data within the spool 6 are transferred to the buffer memory 9 of the printer 7.

Figure 6:
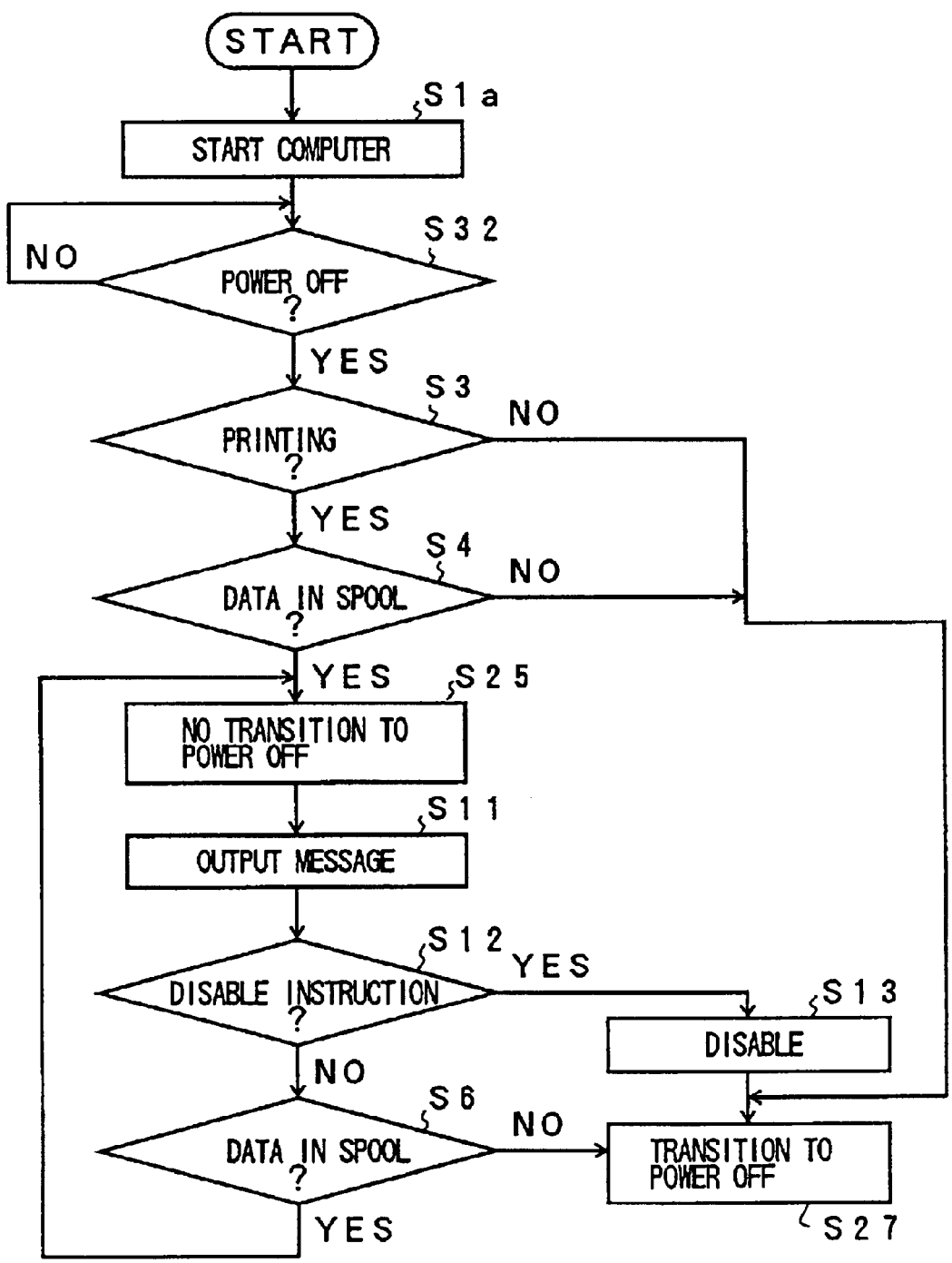
FIG. 6 is a flow chart for explaining the process carried out by a CPU of a personal computer in a fourth embodiment.

FIG. 6 is a flow chart for explaining the process carried out by the CPU 101 of the personal computer 100 shown in FIG. 2 in this fourth embodiment. In FIG. 6, those steps which are the same as those corresponding steps in FIGS. 4 and 5 are designated by the same reference numerals, and a description thereof will be omitted. In this embodiment, the spool monitoring module 4 is normally set to the enabled state.

In FIG. 6, the step S1a sets the personal computer 100 to the started state, and also sets the spool monitoring module 4 to the enabled state. The step S11 displays a message on the display unit 105 to indicate that the printer 7 carrying out a print operation, so as to urge the user to make an input instructing the enabled/disabled state of the spool monitoring module 4. In addition, the step S12 decides whether or not the disabled state of the spool monitoring module 4 is instructed by the user from the input device 104, and the process advances to the step S6 if the decision result in the step S12 is NO. On the other hand, if the decision result in the step S12 is YES, the step S13 switches the spool monitoring module 4 from the enabled state to the disabled state, and the process advances to the step S27. As a result, when the spool monitoring module 4 is set to the disabled state, it is possible to unconditionally set the personal computer 100 to the power OFF state if the user sets the personal computer 100 to the power OFF state.

Accordingly, the process shown in FIG. 6 corresponds to the fourth embodiment of the mode control method. In addition, the memory 102 and/or the memory 103 which forms the fourth embodiment of the storage medium stores the program (means) for making the personal computer 100 (CPU 101) carry out the process shown in FIG. 6.

Of course, the first and second embodiments described above may be combined with the third or fourth embodiment described above if necessary.

In addition, although the present invention is applied to the personal computer in each of the described embodiments, the present invention is of course similarly applicable to information processing apparatuses such as a word processor, an electronic notebook, a communication terminal and a television set, as long as the information processing apparatus is provided with a spool (buffer memory) and may be coupled to a printer.

Further, the present invention is not limited to these embodiment, but various variations and modifications may be made without departing from the scope of the present invention.

What is claimed is:

1. An information processing apparatus adapted to be coupled to a printer, said information processing apparatus having a power save mode in which a power of the information processing apparatus is ON but a power consumption thereof is reduced, and comprising:
    a spool which stores print data to be transferred to the printer; and
    a controller which monitors a state of said spool and when the state becomes a state where a transition of said information processing apparatus to the power save mode is to be made, the transition of said information processing apparatus to the power save mode is prohibited if the print data is stored in said spool.

2. The information processing apparatus as claimed in 1, which further comprises:
    a manager managing the print data stored in said spool,
    said controller prohibiting the transition to the power save mode based on management information of said spool managed by said manager.

3. The information processing apparatus as claimed in claim 1, wherein said controller prohibits a transition to a power OFF state until no print data is stored in said spool.

4. The information processing apparatus as claimed in claim 1, which further comprises:
    a notifying section outputting a message which indicates a printing in progress in the sate where the print data is stored in said spool; and
    a section controlling said controller to an enabled/disabled state based on instruction signal which instructs the enabled/disabled state of said controller.

5. An information processing apparatus comprising:
    a spool which stores print data to be transferred to a printer; and
    a controller which monitors a state of said spool and when the power OFF state is instructed, the transition of said information processing apparatus to the power OFF state is prohibited if the print data is stored in the spool.

6. The information processing apparatus as claimed in claim 5, which further comprises:
    a manager managing the print data stored in said spool,
    said controller prohibiting the transition to the power OFF state based on management information of said spool managed by said manager.

7. The information processing apparatus claimed in claim 5, which further comprises:
    a notifier outputting a message which indicates a printing in progress in the state where the print data is stored in said spool; and
    a section controlling said controller to an enabled/disabled state based on instruction signal which instructs the enabled/disabled state of said controller.

8. The information processing apparatus as claimed in claim 1, which further comprises:
    a section causing a transition to a power save mode and the power OFF state when no print data is stored in said spool.

9. A mode control method for controlling a mode of an information processing apparatus, said information processing apparatus having a power save mode in which a power of the information processing apparatus is ON but a power consumption thereof is reduced, said mode control method comprising the step of:
    (a) monitoring a state of a spool which stores print data to be transferred to a printer and when the state becomes a state where a transition of said information processing apparatus to the power save mode is to be made, the transition of said information processing apparatus to the power save mode is prohibited if the print data is stored in said spool.

10. The mode control method as claimed in claim 9, which further comprises the steps of:
    (b) managing the print data stored in the spool,
    said step (a) prohibiting the transition to the power save mode based on management information of the spool managed in said step (b).

11. The mode control method as claimed in claim 9, wherein said step (a) prohibits a transition to a power OFF state until no print data is stored in the spool.

12. The mode control method as claimed in claim 9, which further comprises the steps of:
    (b) outputting a message which indicates a printing in progress in the state where the print data is stored in the spool; and
    (c) controlling an enabled/disabled state of said step (a).

13. A mode control method for controlling a mode of information processing apparatus, comprising the step of:
    (a) monitoring a state of a spool which stores print data to be transferred to a printer and when the power OFF state is instructed, the transition of said information processing apparatus to the power OFF state is prohibited if the print data is stored in the spool.

14. The mode control method as claimed in claim 13, which further comprises the step of:
    (b) managing the print data stored in the spool,
    said step (a) prohibiting the transition to the power OFF state based on management information of the spool managed by said step (b).

15. The mode control method as claimed in claim 13, which further comprises the steps of:
    (b) outputting a message which indicates a printing in progress in the state where the print data is stored in the spool; and
    (c) controlling an enabled/disabled state of said step (a).

16. The mode control method as claimed in claim 9, which further comprises the steps of:
    (b) causing a transition to a power save mode and the power OFF state when no print data is stored in the spool.

17. A computer readable storage medium which stores a program for controlling a mode of an information processing apparatus, said information processing apparatus having a power save mode in which a power of the information processing apparatus is ON but a power consumption thereof is reduced, comprising:
    means for causing the information apparatus to store print data to be transferred to a printer in a spool; and
    control means for causing the information processing apparatus to monitor a state of said spool and when the state becomes a state where a transition of said information processing apparatus to the power save mode is to be made, the transition of said information processing apparatus to the power save mode is prohibited if the print data is stored in said spool.

18. The storage medium as claimed in claim 17, which further comprises:

managing means for causing the information processing apparatus to manage the print data stored in said spool, said control means causing the information processing apparatus to prohibit the transition to the power save mode based on management information of said spool managed by said managing means.

19. The storage medium as claimed in claim 17, wherein said control means causes the information processing apparatus to prohibit a transition to a power OFF state until no print data is stored in said spool.

20. The storage medium as claimed in claim 17, which further comprises:

notifying means for causing the information processing apparatus to output a message which indicates a printing in progress in the state where the print data is stored in said spool; and means for causing the information processing apparatus to control said control means to an enabled/disabled state based on an instruction signal which instructs the enabled/disabled state of said control means.

21. A computer readable storage medium which stores a program for controlling a mode of an information processing apparatus, comprising:

means for causing the information processing apparatus to store print data to be transferred to a printer in a spool; and control means for causing the information processing apparatus to monitor a state of said spool and when the power OFF state is instructed, the transition of said information processing apparatus to the power OFF state is prohibited if the print data is stored in the spool.

22. The storage medium as claimed in claim 21, which further comprises:

managing means for causing the information processing apparatus to manage the print data stored in said spool, said control means causing the information processing apparatus to prohibit the transition to the power OFF state based on management information of said spool managed by said managing means.

23. The storage medium as claimed in claim 21, which further comprises:

notifying means for causing the information processing apparatus to output a message which indicates a printing in progress in the state where the print data is stored in said spool; and means for causing the information processing apparatus to control said control means to an enabled/disabled state based on an instruction signal which instructs the enabled/disabled state of said control means.

24. The storage medium as claimed in claim 17, which further comprises:

means for causing the information processing apparatus to make a transition to a power save mode and the power OFF state when no print data is stored in said spool.

25. An information processing apparatus adapted to be coupled to an external equipment, said information processing apparatus having a power save mode in which a power of the information processing is ON but a power consumption thereof is reduced, and comprising:

a storage unit which stores data to be transferred to the external equipment; and a controller which monitors a state of said storage unit and prohibits a transition of the information processing apparatus to the power save mode in a state where the data is stored in said storage unit.

26. The information processing apparatus as claimed in claim 25, wherein said external equipment is formed by a peripheral equipment.

\* \* \* \* \*